United States Patent
Watanabe et al.

[11] Patent Number: 6,146,091
[45] Date of Patent: Nov. 14, 2000

[54] GAS TURBINE COOLING STRUCTURE

[75] Inventors: Koji Watanabe; Akiko Aizawa; Rintaro Chikami; Kiyoshi Suenaga, all of Takasago, Japan

[73] Assignee: Mitsubishi Heavy Industries, Ltd., Tokyo, Japan

[21] Appl. No.: 09/256,102

[22] Filed: Feb. 24, 1999

[30] Foreign Application Priority Data

Mar. 3, 1998 [JP] Japan ................... 10-050442
Mar. 17, 1998 [JP] Japan ................... 10-066715

[51] Int. Cl.⁷ ............... F01D 9/02; F01D 9/04; F01D 9/06
[52] U.S. Cl. .......... 415/115; 415/111; 415/115; 415/116; 415/173.7; 415/175; 415/178
[58] Field of Search ................ 415/115, 116, 415/175–176, 178, 173.2, 173.3, 173.1, 111, 112, 173.7, 174.5

[56] References Cited

U.S. PATENT DOCUMENTS

| | | | |
|---|---|---|---|
| 5,480,281 | 1/1996 | Correia | 415/115 |
| 5,488,825 | 2/1996 | Davis et al. | 60/39.75 |
| 5,609,466 | 3/1997 | North et al. | 415/115 |

FOREIGN PATENT DOCUMENTS

| | | |
|---|---|---|
| 8-165904 | 6/1996 | Japan . |
| 9-32580 | 2/1997 | Japan . |
| 10-252410 | 9/1998 | Japan . |

*Primary Examiner*—Edward K. Look
*Assistant Examiner*—Rhonda Barton
*Attorney, Agent, or Firm*—Wenderoth, Lind & Ponack, L.L.P.

[57] ABSTRACT

A gas turbine having cooling structure disposed on an outside peripheral side in a radial direction of a movable vane in which the cooling efficiency is further improved and sealing structure disposed on an inner peripheral side to suppress leakage of sealing air and prevent invasion of combustion gas into the turbine disc and enlargement of sealing air clearance is prevented. Outwardly in the radial direction, a gap between ring segment (90) and impingement cooling plate (92) disposed on the outer periphery thereof, is divided in the axial direction by a pressure partition plate (97) extending in a circumferential direction so as to provide plural cavities adjusted to different pressures, thereby forming a cooling structure in the ring segment (90). Inside in the radial direction, a static vane inside diameter side cavity (53) and downstream cavity (31) are formed by a box (57) for sealing the static vane inside diameter side cavity (53). Further, a ring-like holding ring (38) holds a sealing piece (9) for regulating the clearance (6) communicating between the upstream cavity (31) and the downstream cavity (32).

5 Claims, 14 Drawing Sheets

GAS TURBINE COOLING STRUCTURE

BACKGROUND OF THE INVENTION

1. Field of the Invention

The present invention relates to a gas turbine having a cooling structure of a ring segment disposed on an outside periphery in the radius direction of a movable vane and further having a sealing structure for preventing an invasion of combustion gas into a turbine disc.

2. Description of the Prior Art

As for an entire construction of the gas turbine, as schematically shown in FIG. 15, air is compressed in a compressor 81, fuel is charged to a combustor 82 to generate combustion gas and then the same combustion gas is introduced into a turbine 83 as main stream gas so as to rotate a generator 84.

As generally shown in FIG. 16, the turbine 83 comprises plural rows of static vanes 3 and plural rows of movable vanes 2 which are alternately disposed. An outside peripheral side, in the radius direction (or outside diameter side in the radius direction), of the movable vane 2 is structured so as to be surrounded by plural ring segments or tip seal segments 90 which are divided in the peripheral direction so as to feed a high temperature gas through an appropriate gap between that ring and movable vane 2.

The ring segment 90 has a cooling structure capable of bearing a high temperature main stream gas 15 discharged from the combustor 82. An example of the ring segment 90 having this cooling structure in a conventional gas turbine will be described with reference to FIGS. 8 and 9.

Cooling medium 89 extracted from the compressor 81 or cooling medium 89 supplied from an appropriate supply source provided outside is supplied to a cavity 96 through an impingement cooling plate 92 in which impingement cooling holes 91 are formed. The cooling medium 89 comes into contact with the ring segment 90 so as to forcibly cool the ring segment 90. After that, it is fed through a cooling path 93 provided in the ring segment 90 so as to cool the ring segment 90 again and then discharged into the main stream gas 15 through a ring segment rear end 94.

The cooling path 93 may be formed in a circular, rectangular, wave-like or other shape in its cross section and the cooling path 93 is constructed by a plurality of holes extending in the axial direction disposed substantially parallel to one another along the periphery.

In the gas turbine, although the performance thereof is improved by increasing the temperature of combustion gas, and high temperature combustion gas directly strikes the vane portion, cooling air is supplied through the interior of the vane against a rise of the temperature of the combustion gas to suppress a rise in the temperature of the vane portion.

Thus, in a disc portion for supporting the aforementioned vane portion, a cavity is provided between the disc portion and gas passage for the disk so as not to directly contact the high temperature combustion gas, and then by supplying air having a higher pressure and lower temperature than in the gas passage to the same cavity, the combustion gas is sealed so as to prevent a rise in the temperature of the rotor.

In a conventional industrial gas turbine constructed according to such a philosophy, a structure for preventing a rise in temperature of the aforementioned disc portion by the high temperature combustion gas (high temperature gas, main stream gas) will be described with reference to FIGS. 10 and 11.

The high temperature gas A flows in the direction indicated by arrows 8 so that it passes the movable vane 1, static vane 3 and movable vane 2 in order from the upstream of the turbine to the downstream thereby forming a gas passage 7. At this time, if the high temperature gas A in the gas passage 7 (corresponding to the main stream gas 15 in FIGS. 1 and 16) invades in the upstream cavity 31 and downstream cavity 32 formed by the static vane 3, disc 4 and disc 5, and the temperatures of the disc 4 and disc 5 become higher than a tolerable value.

To prevent this phenomenon, sealing air B having a higher pressure and lower temperature than in the gas passage 7 is introduced from an outside diameter side of the static vane 3 into a static vane inside cavity 33 (hereinafter referred to as cavity 33) formed by the inside diameter side (or inside peripheral side) of the static vane 3 and a holding ring 38 disposed so as to oppose it and by supplying the aforementioned sealing air B from the cavity 33 in the direction indicated by an arrow 35 through a hole 34 open to the upstream cavity 31. Pressure of the upstream cavity 31 is kept higher than the pressure of the gas passage 7 so as to prevent an invasion of the high temperature gas A.

The sealing air B, which is supplied to the upstream cavity 31 in this way, passes through a clearance 6 formed by a sealing piece 9 mounted on the holding ring 38 and the discs 4, 5 sealed with a inter-disc seal 50. As shown in FIG. 10, the sealing air flows in a direction indicated by an arrow 36, so that the sealing air B is supplied from the upstream cavity 31 to the downstream cavity 32 which has a lower 9 pressure.

As a result, the pressure of the downstream cavity 32 is also kept higher than the pressure of the gas passage 7, corresponding to the downstream position relative to the static vane 3, so that an invasion of the high temperature gas A into the downstream cavity 32 is prevented.

However, if the clearance 6 is too large, the sealing air B more likely flows into the downstream cavity 32 so that a pressure of the upstream cavity 31 drops. To avoid this drop of pressure, it is necessary to keep the pressure of the upstream cavity 31 higher than the pressure of the gas passage 7. Thus, a larger amount of the sealing air B is necessary.

The sealing air B keeps the pressures of the upstream cavity 31 and downstream cavity 32 higher than the pressure of the gas passage 7 so as to prevent a rise in the temperature of the disc portion and then the air blows into the gas passage 7. Thus, after this blow, the sealing air B turns to waste air which carries out no work.

Therefore, although from the view point of efficiency, it is desirable to reduce the entire flow rate of the sealing air B as much as possible without expanding the aforementioned clearance 6, if the clearance 6 is too small, the sealing piece 9 and the discs 4, 5 come into contact with each other so as to produce damage therein, due to a difference in elongation by heat in non-steady state during gas turbine operation. Therefore, it is necessary to set and maintain a necessary but minimum clearance in which contact and damage are prevented and the flow rate of the sealing air B is minimized.

Next, as another conventional example, an airplane gas turbine will be described with reference to FIGS. 12–14.

The sealing air B is introduced from an outside diameter side of the static vane 3 into a static vane inside cavity 53 (hereinafter referred to as cavity 53) formed by a box 57 mounted on the inside diameter side of each of the static vanes 3, and is supplied through a hole 54 that is open to the upstream cavity 51 in a direction indicated by an arrow 55 so as to keep the pressure of the upstream cavity 51 higher than the pressure of the gas passage 7, thereby preventing an invasion of the high temperature gas A.

The box 57 is of a completely sealed structure except the hole 54 for feeding the sealing air B into the upstream cavity 51 so that the sealing air B does not leak from the cavity 53 directly to the downstream cavity 52.

Therefore, because all the sealing air B introduced into the cavity 53 is supplied into the upstream cavity 51, the leakage of the sealing air B is eliminated so that the amount of the sealing air B can be reduced.

Further, the amount of the sealing air B supplied from the upstream cavity 51 to the downstream cavity 52 in a direction indicated by an arrow 56 is limited by the clearance 6 formed by the sealing piece 9 mounted on an inside diameter side of the box 57 and the discs 4, 5.

The box 57 is directly mounted on the inside diameter side of the static vane 3, and because the static vane 3 is disposed in the gas passage 7 so that it is in contact with the high temperature gas A, the temperature change thereof is large and the change rate thereof due to thermal elongation is also large. Therefore, a displacement in the radius direction of the sealing piece 9 mounted on the same box 57 is governed by the box 57 and static vane 3 so as to become larger.

For this reason, the clearance 6 on assembly stage (initial stage) of the turbine needs to be set considering a thermal expansion amount 71 of the static vane 3 as shown in FIG. 14. And, therefore, the clearance 6 expands until the thermal expansion reaches its saturation (the amount of the sealing air B needs to be increased), so that the performance of the turbine at the time of partial load drops.

Further, because the thermal expansion amount of the static vane 3 is determined depending on the temperature distribution of the combustion gas that is likely to produce a deviation in temperature distribution, if a maximum of that deviation is considered, it is difficult to reduce the size of the clearance 6.

Although this thermal expansion produces only a slight influence in the case of an airplane gas turbine, because the diameter thereof is small, however if the same structure is applied to an industrial gas turbine, the displacement by the thermal expansion of the static vane in the industrial gas turbine, which has a large diameter is large as is indicated in FIG. 14 as a large displacement 72, and therefore becomes a problem that cannot be neglected.

As compared to the conventional industrial gas turbine, shown in FIGS. 10 and 11 with respect to this point, in the same industrial gas turbine, the holding ring 38 on which the sealing piece 9 is mounted is of a ring-like structure independent of the static vane 3 in the radius direction. Therefore, the displacement of the sealing piece 9 mounted thereon in the radius direction is governed by only the thermal expansion of the holding ring 38.

Further, because differences in diameter and temperature between the holding ring 38 and discs 4, 5 are small, the displacement of the clearance 6 in non-steady state is small as is indicated as a small displacement 73, and therefore, the clearance 6 at the time of assembly (initial stage) may be set small.

Further, because the displacement of the clearance 6 is independent of the thermal expansion of the static vane 3, which is largely influenced by a temperature distribution of the combustion gas, and therefore has a large displacement, it is not influenced by the expansion of the static vane. Therefore, the aforementioned displacement does not have to be considered and accordingly the clearance 6 may be narrowed. Thus, the flow rate of the sealing air B supplied from the cavity 31 to the cavity 32 can be reduced to a necessary but minimum level at all times including a partial load time.

In the cooling structure of the ring segment dispose d on the outside peripheral side in the radius direction of the movable vane of the above described conventional gas turbine, the cavity 96 needs to be kept under a higher pressure than the main stream gas 15 for the cooling medium 89 to prevent a backlash of the high temperature main stream gas 15. Therefore, the cavity 96, formed on the outside peripheral side of the ring segment, is kept under a relatively higher pressure than the main stream gas 15 on the upstream side in the axial direction, when the cooling medium 89 is supplied.

On the other hand, the pressure of the main stream gas 15 in the downstream side in the axial direction is lower than the pressure of the upstream side in the axial direction. Thus, the cooling medium 89 in the cavity 96, which has been adjusted of pressure in relation to the main stream gas 15 in the upstream side in the axial direction, produces excessive leakage so that a drop in the turbine efficiency is induced.

The temperature of the cooling medium 89 in the cooling path 93 is gradually raised by heat exchange for cooling as the medium flows downstream in the axial direction, so that it reaches a quite high temperature in the downstream of the ring segment, and therefore its cooling performance is reduced.

The structure of the sealing portion in the above-described industrial gas turbine has the following problems in reducing the flow rate of the aforementioned sealing air B.

Because the static vanes 3 are individually independent, a gap is produced between each vane. Even though a sealing plate 37 is provided, the gap is not completely closed by the sealing plate so that gaps 39, 40 are left, as shown in FIG. 10.

As a result, the sealing air B, introduced from the outside diameter side of the static vane 3 to the cavity 33 is supplied into the upstream cavity 31 through the hole 34 and at the same time leaks directly into the downstream cavity 32 through the gaps 39, 40 as leaking air C.

Thus, in the upstream cavity 31, the flow rate of the sealing air B supplied is insufficient so that the pressure thereof drops and the high temperature gas A invades the upstream cavity. To protect against this phenomenon, a larger amount of sealing air B is necessary in order to account for the flow rate of the leaking air C, so that the efficiency of the gas turbine drops.

On the other hand, in case of the conventional airplane gas turbine, although the generation of the leaking air C to the downstream cavity 32 as seen in the aforementioned industrial gas turbine has been avoided, there is a problem that the displacement of the clearance is governed largely by the thermal deformation of the static vane so as to become larger.

With respect to the relation between the cavity 33 of the industrial gas turbine or cavity 53 of the airplane gas turbine and each corresponding upstream cavity 31, 51 and downstream cavity 32, 52, each of the conventional industrial turbine and the airplane turbine have advantages and disadvantages, and therefore, it is difficult to determine which is better.

SUMMARY OF THE INVENTION

Accordingly, the present invention has been achieved to solve the problems mentioned above, and therefore an object of the present invention is to provide a gas turbine in which the cooling efficiency of its ring segment is improved, leakage of the sealing air is suppressed and expansion of the clearance is prevented to ensure a preferable sealing.

To achieve the above object, as a first aspect of the present invention, there is provided a gas turbine wherein an outside periphery of a ring segment for forming a casing in which a high temperature combustion main stream gas passes is surrounded by an impingement cooling plate so as to form a ring segment cavity therebetween, a static vane inside diameter side cavity is formed by a box provided on an inside periphery of a static vane disposed between a movable vane and an adjacent movable vane thereof operated by the main stream gas in the casing, sealing air introduced into said static vane inside diameter side cavity is fed to another cavity formed in a gap between the movable vane and the static vane so that a pressure therein is kept higher than a pressure in a gas path. The ring segment cavity is divided in the axial direction by a pressure partition plate extending in the circumferential direction between the ring segment and the impingement cooling plate of outside periphery thereof so as to provide plural cavities in which the internal pressure of an upstream cavity is kept higher than the internal pressure of a downstream cavity.

According to the present invention, on the inside peripheral side, the sealing air introduced to the cavity on the inside diameter side of the static vane is fed to the other cavity formed in a gap between the movable vane and the static vane. The air is kept at a higher pressure than the gas path pressure so as to seal the main stream gas. On the outside peripheral side, the plural cavities divided by the pressure partition plate to the upstream cavity and downstream cavity in the axial direction are adjusted to mutually different pressures. Thus, they are capable of individually coping appropriately with the main stream gas whose pressure is different between the upstream and downstream cavities in the axial direction. As a result, backlash of the main stream gas is prevented in the upstream side and leakage of the air through a gap is minimized in the downstream side, so as to improve the efficiency.

Further, as a second aspect of the present invention, there is provided a gas turbine according to the first aspect wherein each of the plural cavities is open at a tip end of the movable vane at a position different in the axial direction through a ring segment cooling hole passing through from an outside peripheral side of the ring segment to an inside peripheral side thereof. The ring segment cooling hole extends in a downstream direction.

That is, according to the present invention, on the outside peripheral side of the gas turbine, each cavity is open at the tip end of the movable vane through the ring segment cooling hole that extends in the downstream direction and passes through from the outside peripheral side to the inside peripheral side. The ring segment cooling hole is located at a different position in the axial direction. Thus, the length of the ring segment cooling hole from each cavity to the opening thereof at the tip end of the movable vane is reduced so that the cooling medium is blown to the tip end of the movable vane before it is heated. Thus, the cooling efficiency for the movable vane is improved.

Further, as a third aspect of the present invention, there is provided a gas turbine wherein an outside periphery of a ring segment for forming a casing in which a high temperature combustion main stream gas passes is surrounded by an impingement cooling plate so as to form a ring segment cavity therebetween. A static vane inside diameter side cavity is formed by a box provided on an inside periphery of a static vane disposed between a movable vane and an adjacent movable vane thereof operated by the main stream gas in the casing. Sealing air is introduced into the static vane inside diameter side cavity and is fed to another cavity formed in a gap between the movable vane and the static vane so that the pressure therein is kept higher than the pressure in a gas path. The another cavity includes an upstream cavity of which a wall face is formed by a movable vane disc existing in front of the static vane and a downstream cavity of which a wall face is formed by another movable vane disc existing in the back of the static vane where the pressure is lower than in the upstream cavity. Also, the sealing air is supplied from the static vane inside diameter side cavity to the upstream cavity and the downstream cavity so that the pressures in the upstream cavity and the downstream cavity are raised higher relative to the pressure in the gas path thereby preventing an invasion of the combustion gas into the discs.

Further, as a fourth aspect of the present invention, there is provided a gas turbine wherein an outside periphery of a ring segment for forming a casing in which a high temperature combustion main stream gas passes is surrounded by an impingement cooling plate so as to form a ring segment cavity therebetween. A static vane inside diameter side cavity is formed by a box provided on an inside periphery of a static vane disposed between a movable vane and an adjacent movable vane thereof operated by the main stream gas in the casing. Sealing air is introduced into the static vane inside diameter side cavity and is fed to another cavity formed in a gap between the movable vane and the static vane so that the pressure therein is kept higher than the pressure in a gas path. The ring segment cavity is divided in the axial direction by a pressure partition plate extending in the circumferential direction between the ring segment and the impingement cooling plate of outside periphery thereof so as to provide plural cavities each of which is adjusted to a different pressure thereby constructing a cooling structure for the ring segment. Another cavity includes an upstream cavity of which a wall face is formed by a movable vane disc existing in front of the static vane and a downstream cavity of which a wall face is formed by another movable vane disc existing in the back of the static vane where a pressure is lower than in the upstream cavity. And, the sealing air is supplied from the static vane inside diameter side cavity to the upstream cavity and the downstream cavity so that the pressures in the upstream cavity and the downstream cavity are raised higher relative to the pressure in the gas path thereby preventing an invasion of the combustion gas into the discs.

Further, as a fifth aspect of the present invention, there is provided a gas turbine according to the third aspect or the fourth aspect further comprising a ring-like holding ring supported movably in the radius direction relative to the box which forms the static vane inside diameter side cavity sealingly from the downstream cavity and having a sealing piece on an inside periphery thereof for regulating a clearance communicating from the upstream cavity to the downstream cavity.

That is, according to the present invention, on the inside diameter side of the gas turbine, the cavity inside the static vane is supplied with the sealing air and is formed by the box sealing it from the downstream cavity. Thus, the aforementioned sealing air is supplied to the upstream cavity without leakage, thereby inducing no drop in the efficiency.

Because the clearance, communicating from the upstream cavity to the downstream cavity, is regulated by the sealing piece held by the ring-like holding ring movable in the radius direction relative to the aforementioned box. The same clearance is separated from an influence of the thermal deformation of the box and static vane. As a result, there is no fear that the seal fin enlarges the clearance so that a large amount of the sealing air is allowed to flow, thereby leading to a drop in the efficiency. That is, it is possible to ensure a stabilized supply of the sealing air which does not induce a reduction of the efficiency.

DESCRIPTION OF THE PREFERRED EMBODIMENTS

Figure 1:
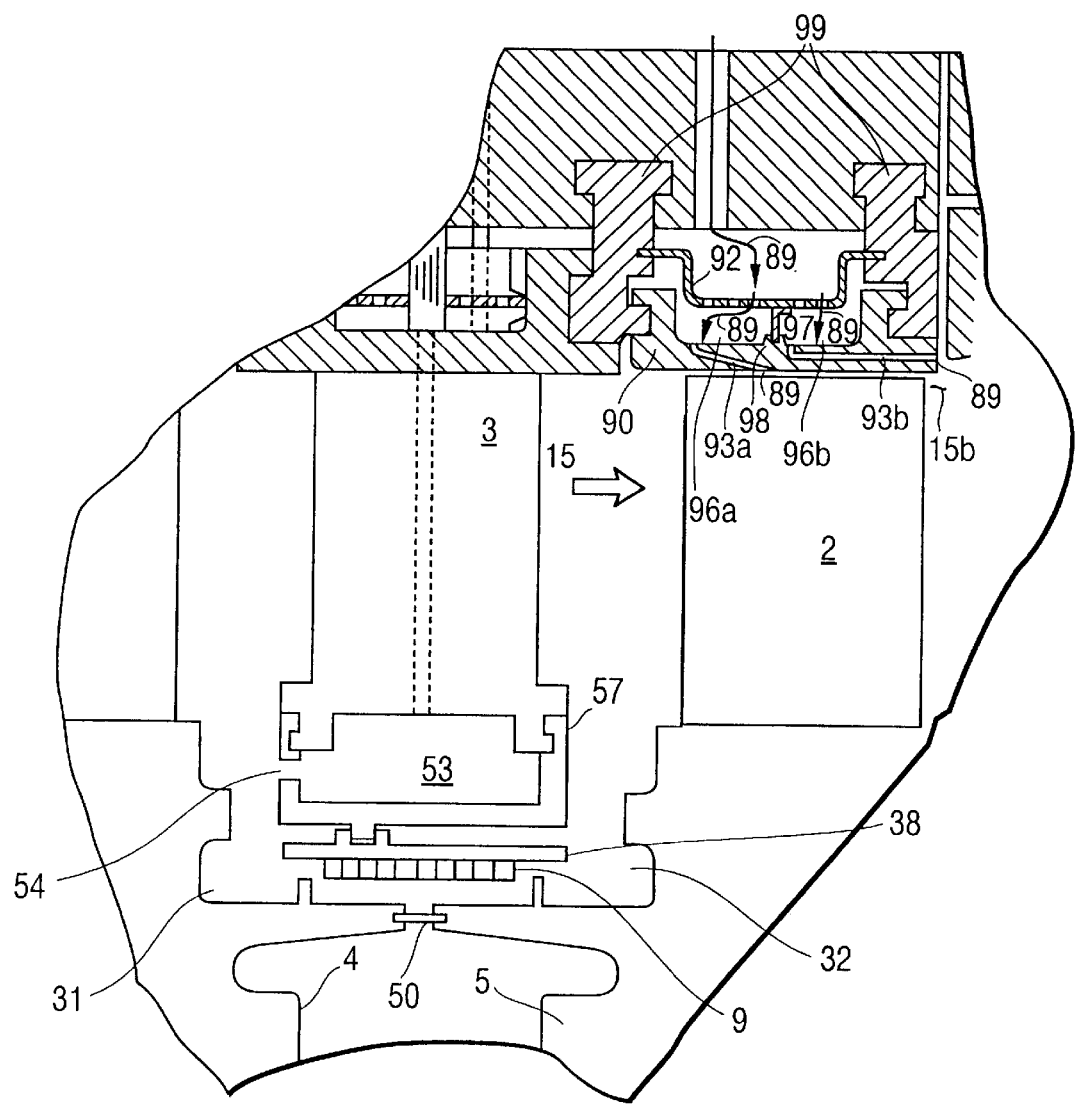
FIG. 1 is a partially broken away sectional view of a cooling structure in a ring segment and sealing structure in a disc of a gas turbine according to an embodiment of the present invention.
Figure 4:
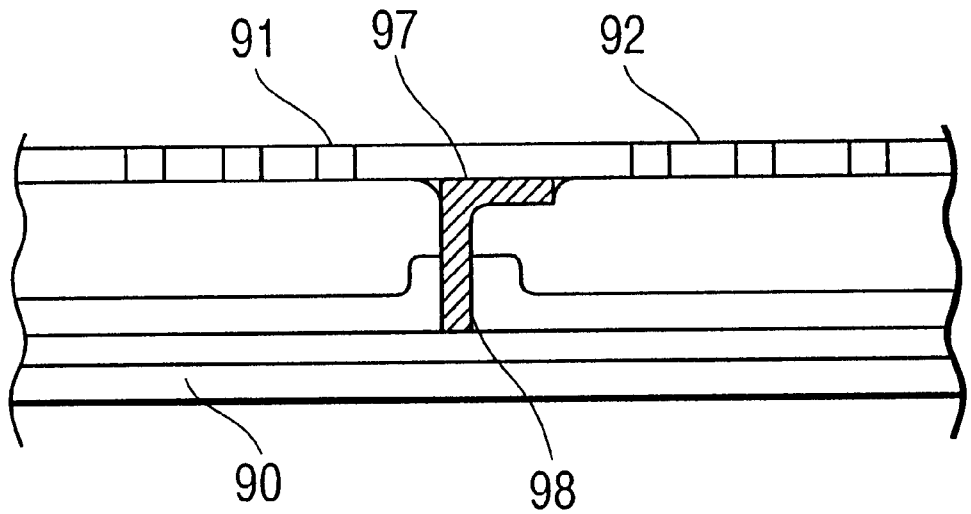
FIG. 4 is an explanatory view showing cavity division by the pressure partition plate which is a major part of the ring segment cooling structure of FIGS. 2 and 3.
Figure 5:
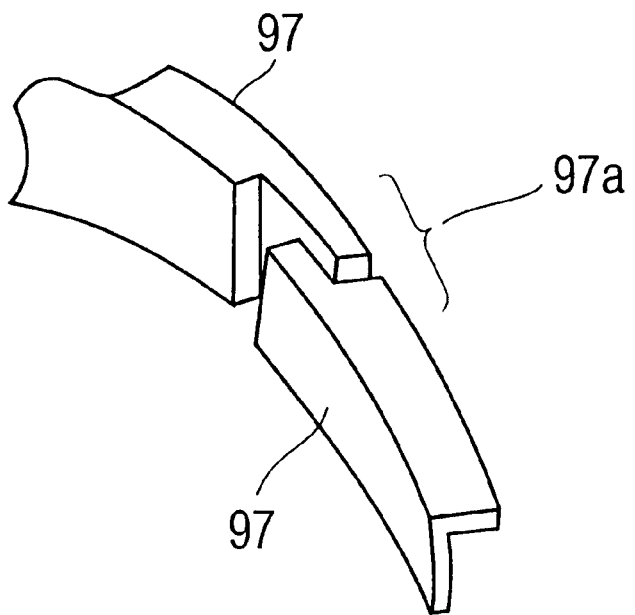
FIG. 5 is an explanatory view showing a joint of the division parts of the pressure partition plate shown in FIG. 4.
Figure 6:
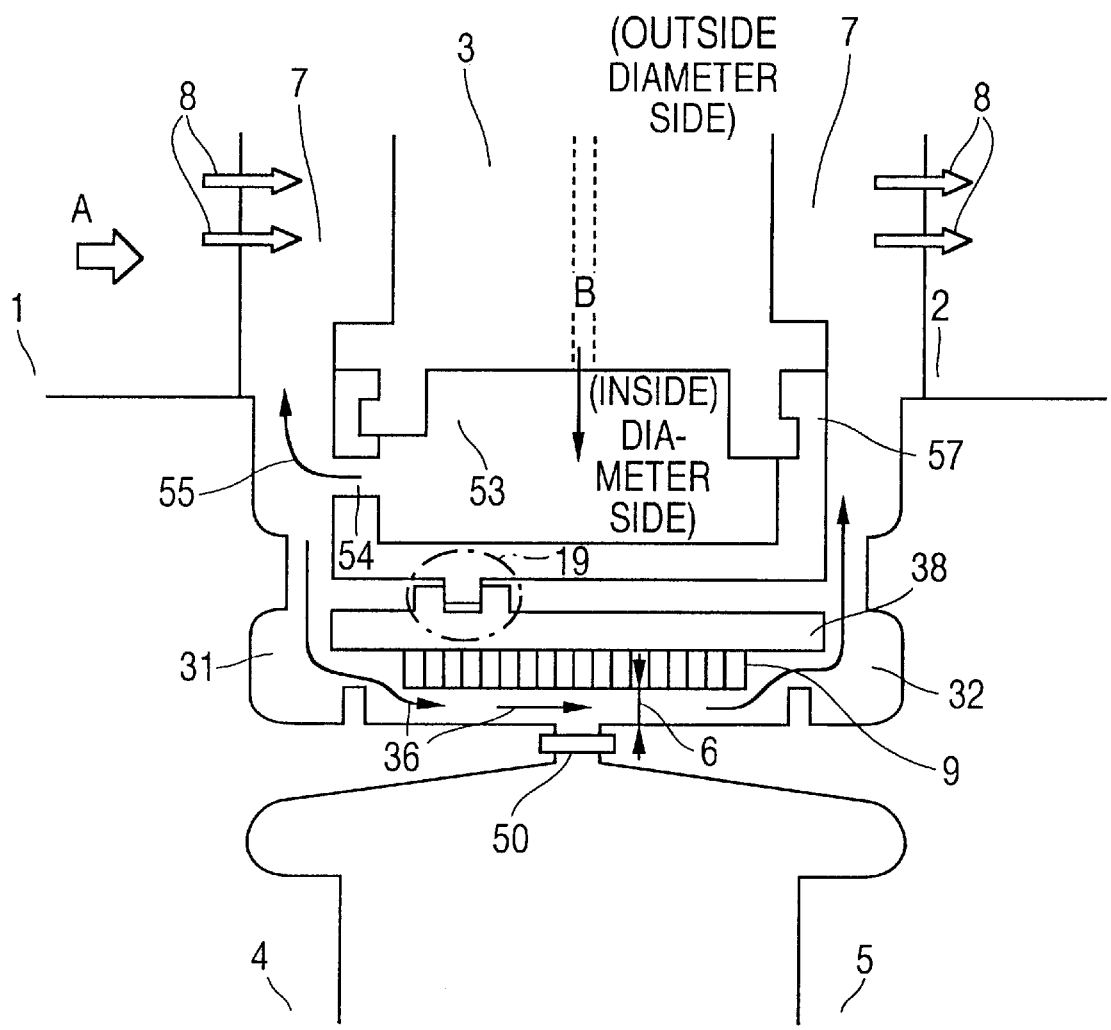
FIG. 6 is a sectional view showing a sealing structure for the disc in the gas turbine, which is located on the inside diameter side in the radius direction of FIG. 1.
Figure 7:
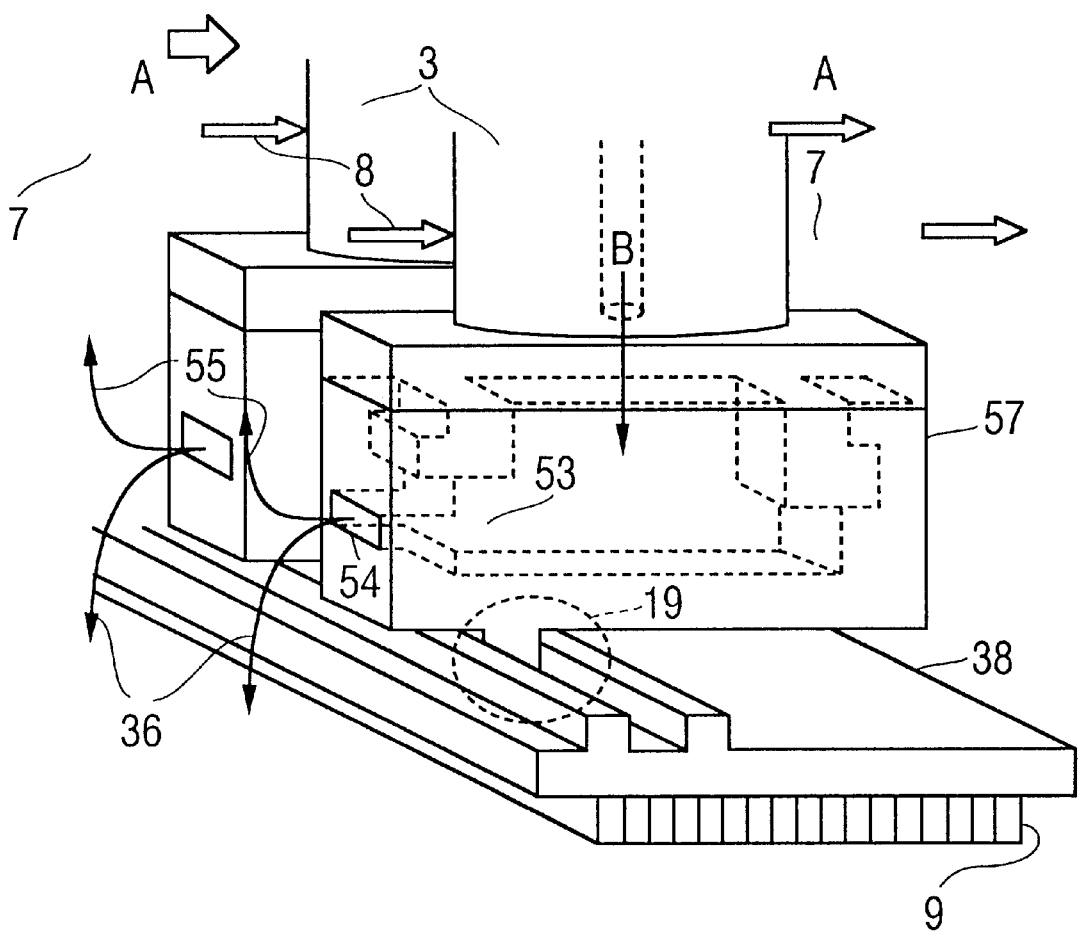
FIG. 7 is a perspective view showing major parts of FIG. 6 in detail.
Figure 8:
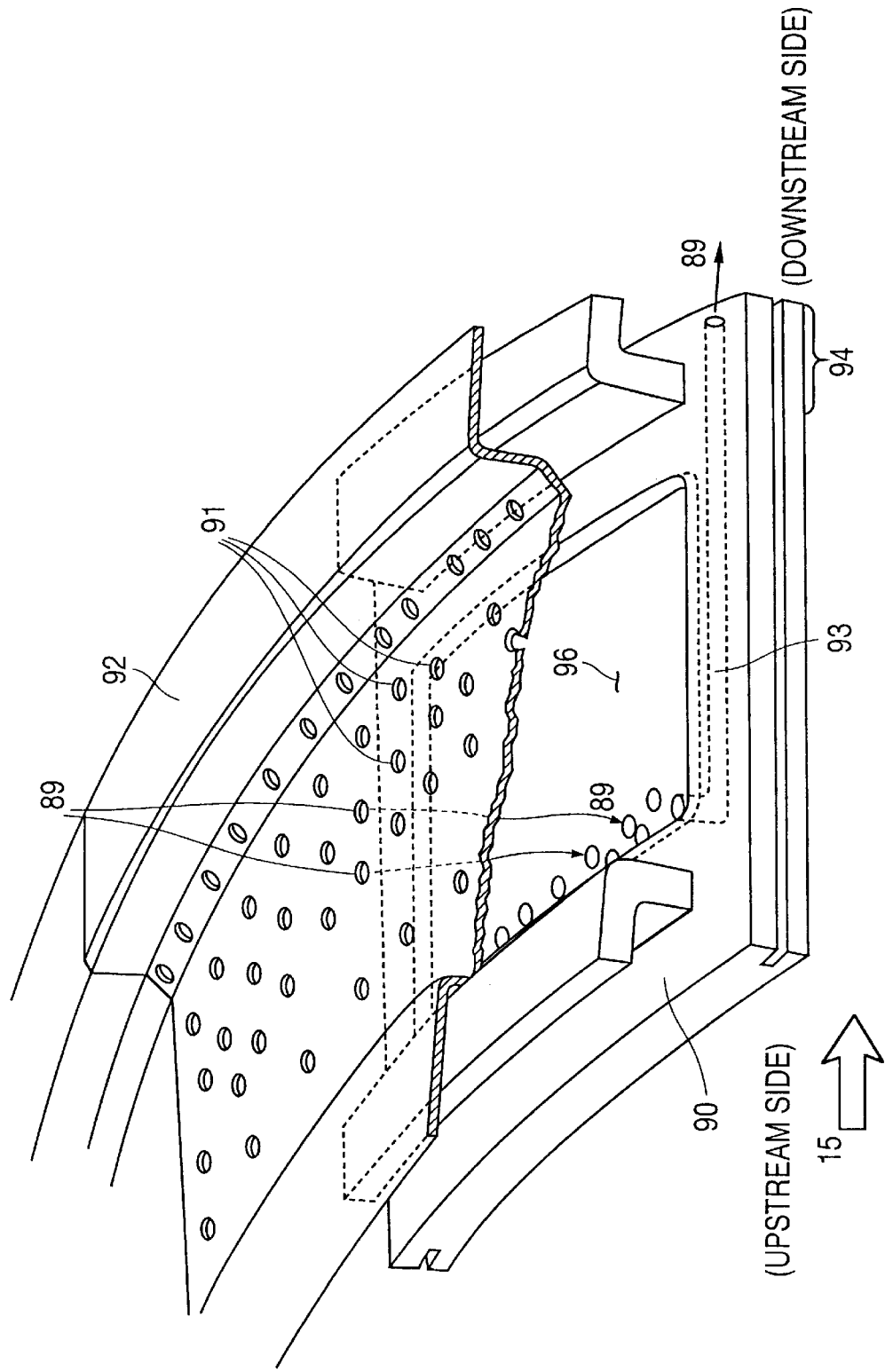
FIG. 8 is a partially broken perspective view of the ring segment cooling structure in a conventional gas turbine.
Figure 9:
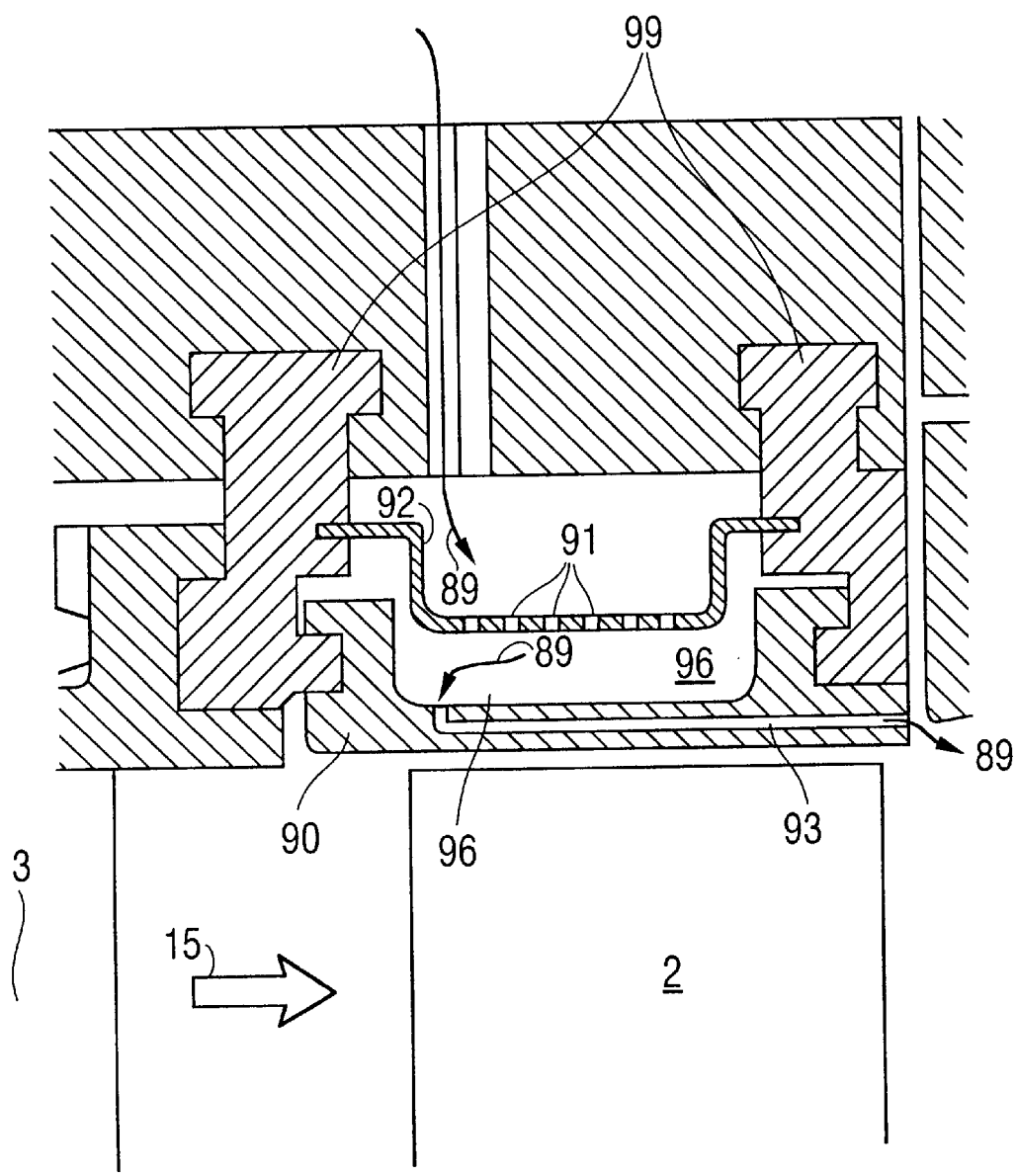
FIG. 9 is a side sectional view of the conventional ring segment cooling structure.
Figure 10:
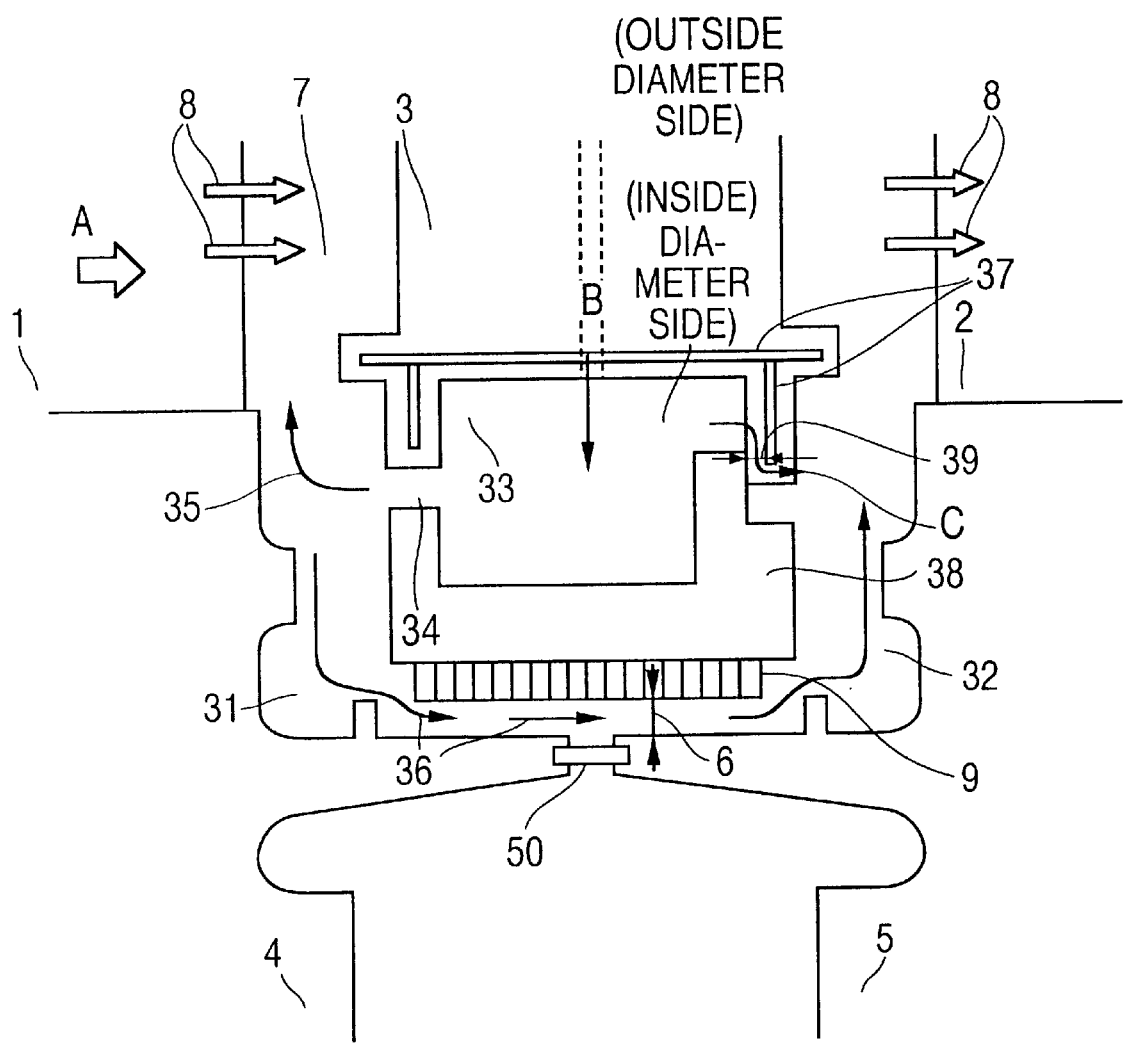
FIG. 10 is a sectional view showing the disc sealing structure in the conventional industrial gas turbine.
Figure 11:
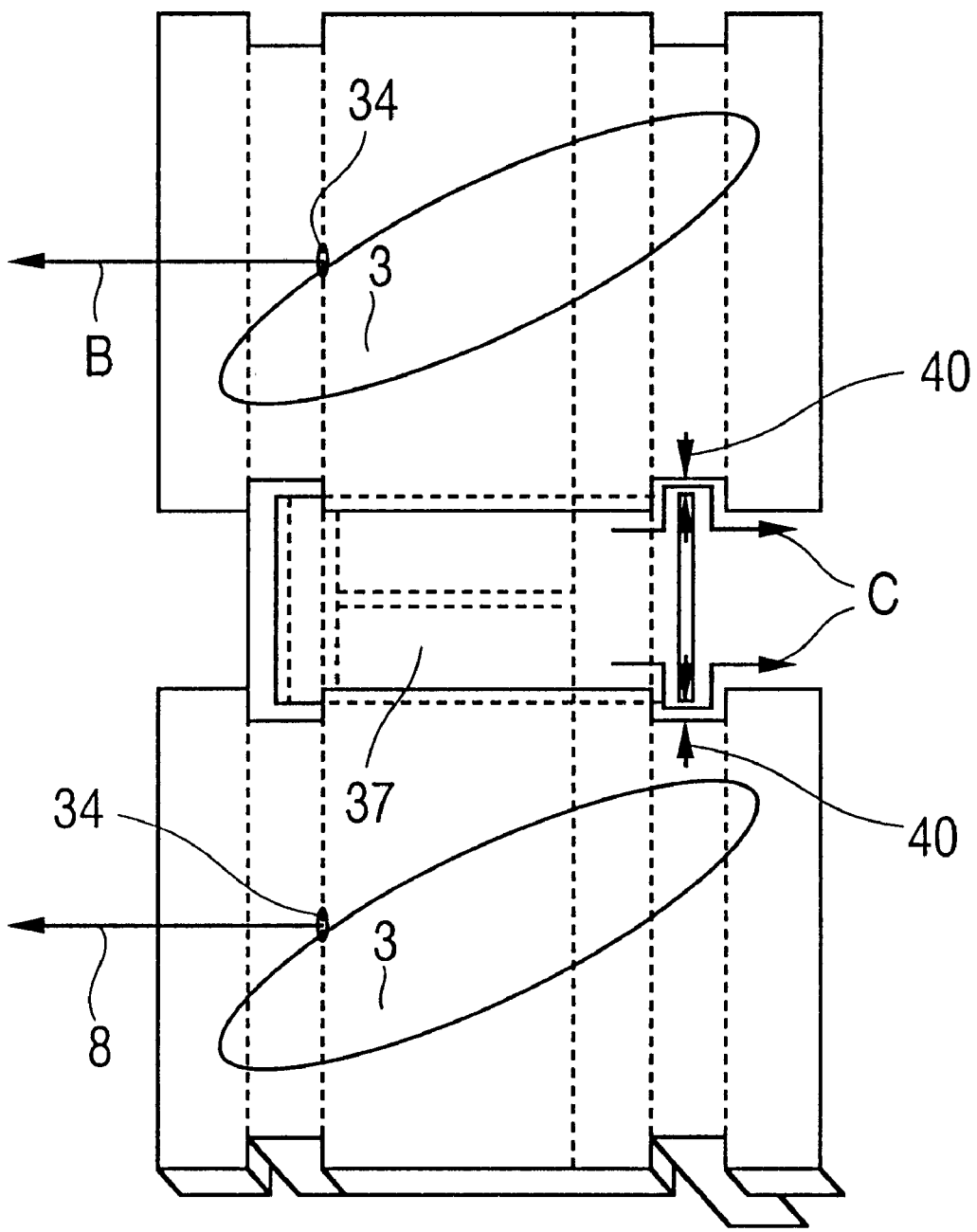
FIG. 11 is a top view showing an enlargement of the major parts of FIG. 10.
Figure 12:
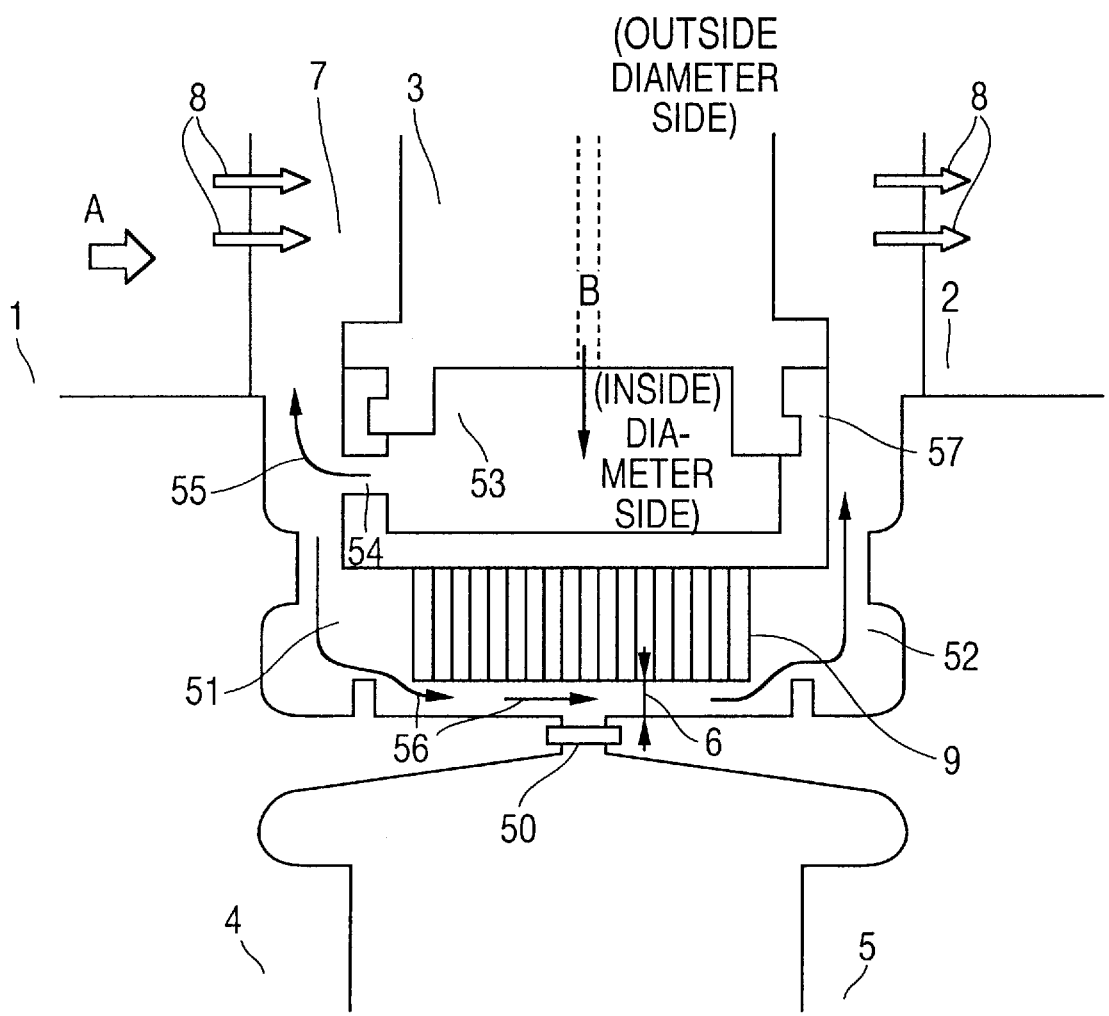
FIG. 12 is a sectional view showing the disc sealing structure in the conventional airplane gas turbine.
Figure 13:
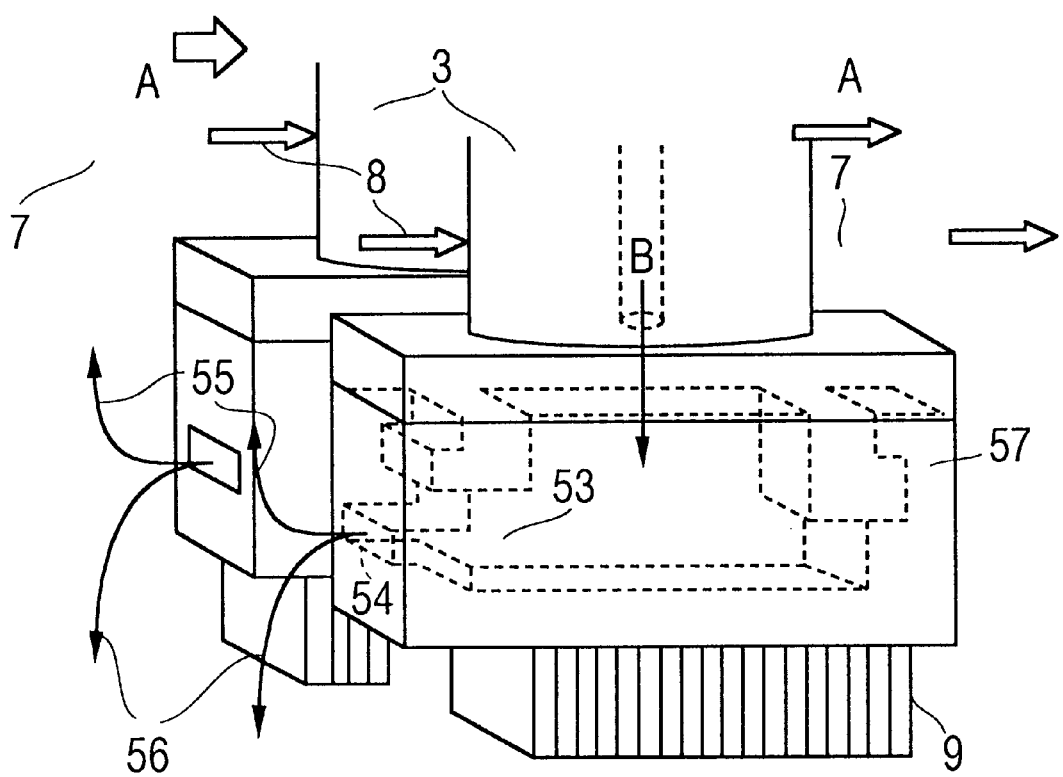
FIG. 13 is a perspective view showing the major parts of FIG. 12.
Figure 14:
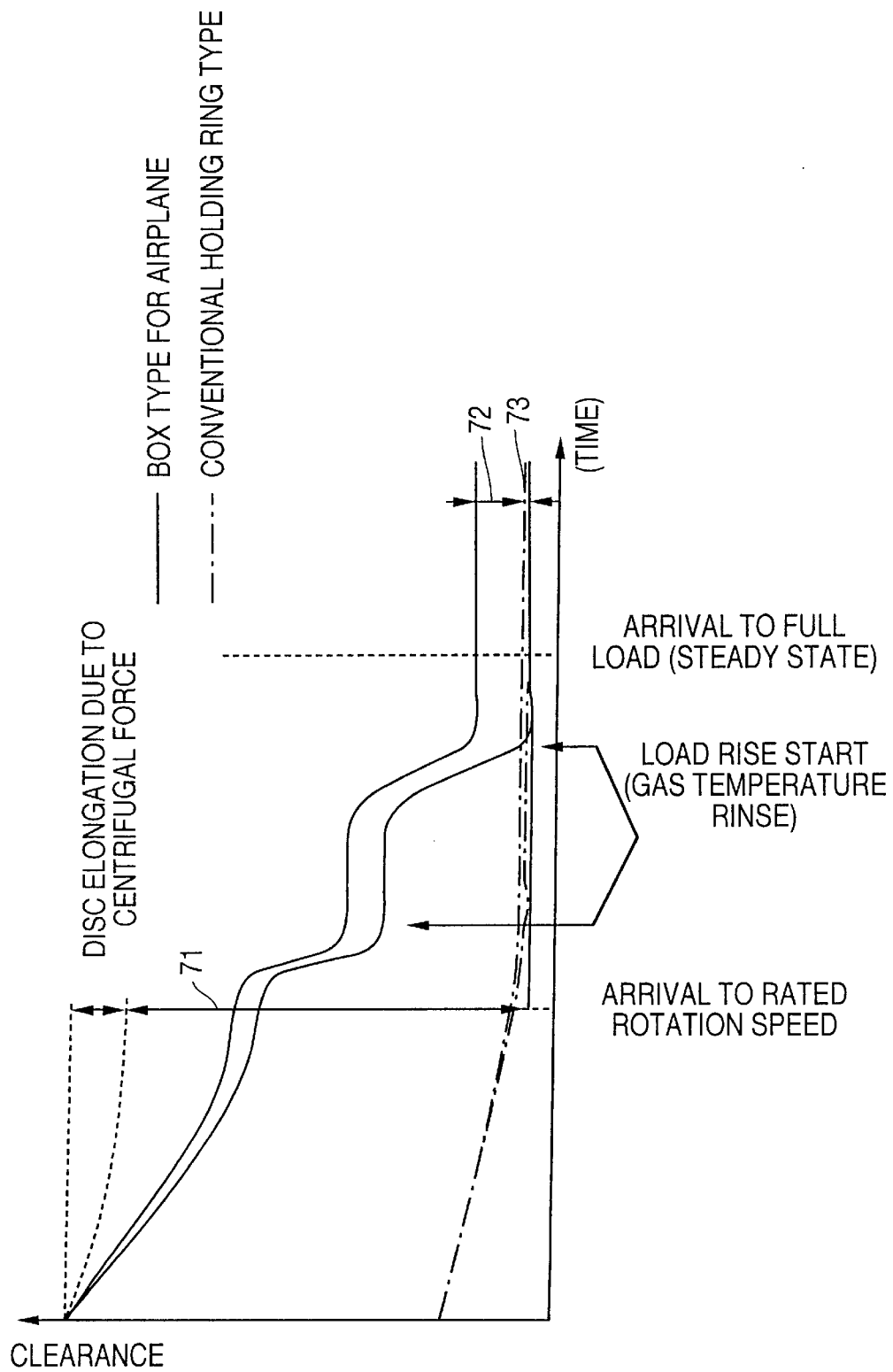
FIG. 14 is an explanatory view showing changes of the clearance at startup time in a conventional industrial gas turbine and airplane gas turbine.
Figure 15:
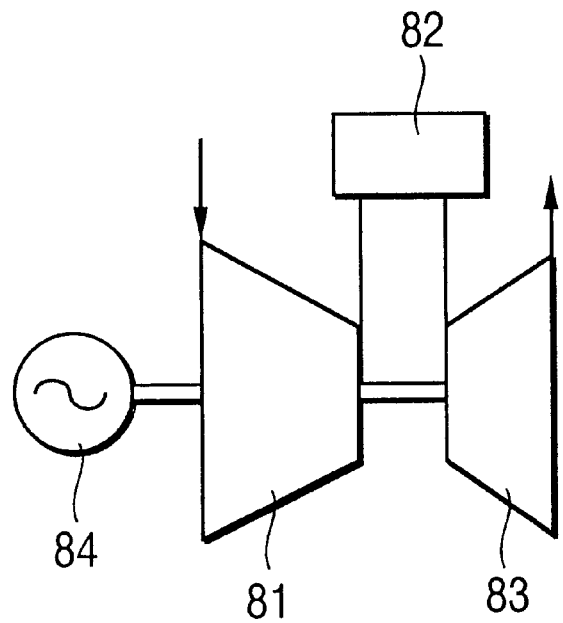
FIG. 15 is an explanatory view schematically showing an entire structure of the conventional gas turbine.
Figure 16:
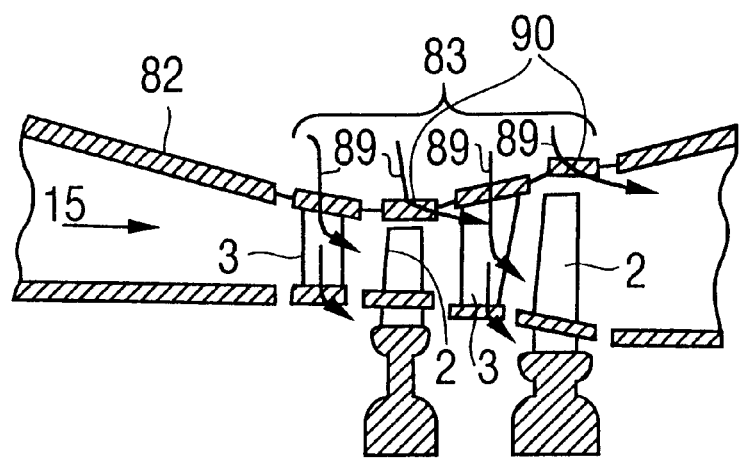
FIG. 16 is an explanatory view schematically showing a general structure of the conventional turbine portion.

FIG. 1 shows an entire structure of an embodiment of the present invention. FIGS. 2–5 show a cooling structure of the outside peripheral side in the radial direction and FIGS. 6 and 7 show the sealing structure of the inside diameter side.

The same reference numerals are used to denote the same components as those of the aforementioned conventional apparatus in the drawings, and a description of the same is omitted, if possible, and only the main points of the present invention will be described.

Figure 2:
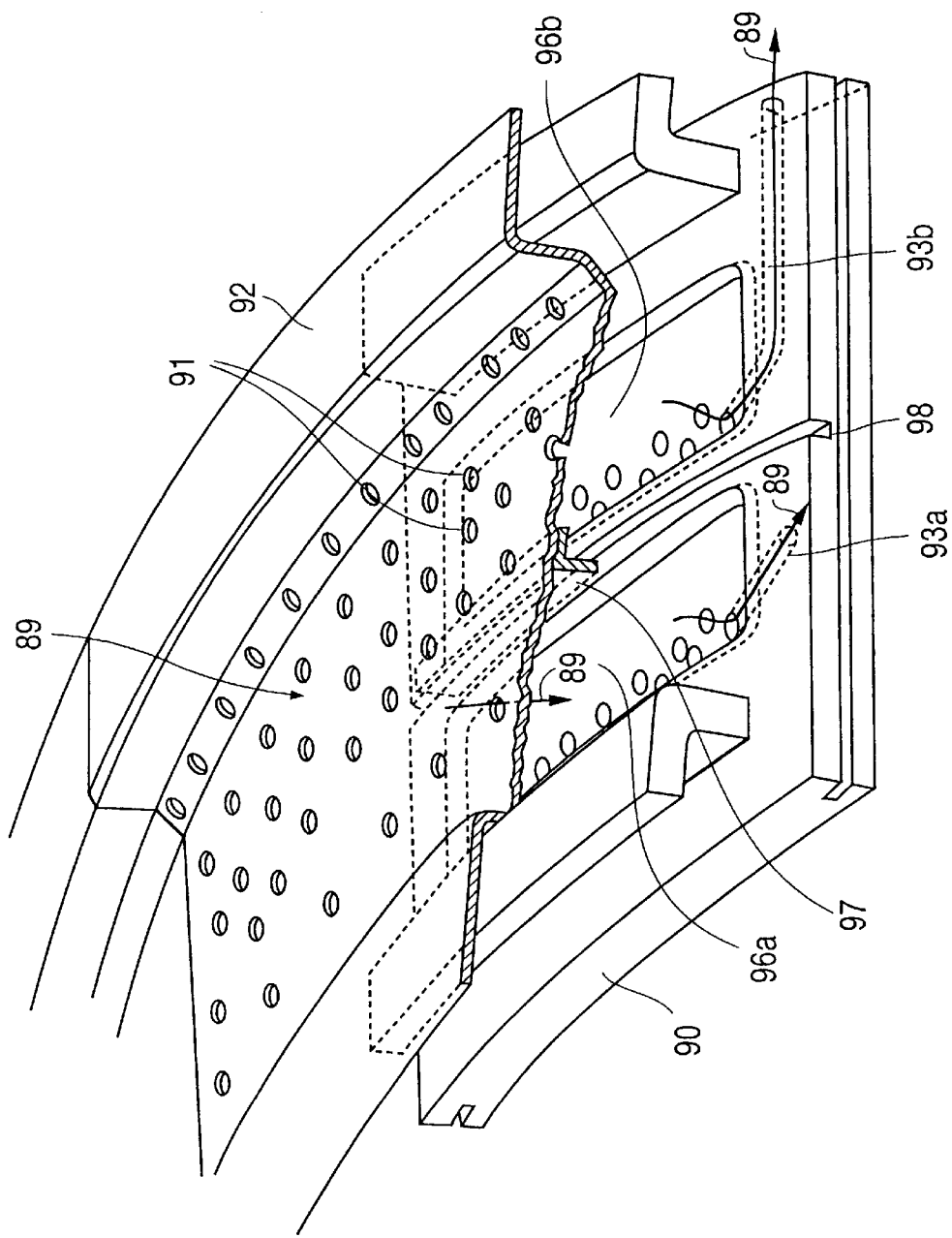
FIG. 2 is a partially broken away perspective view of the ring segment cooling structure of the gas turbine located on the outside diameter side in the radius direction of FIG. 1.
Figure 3:
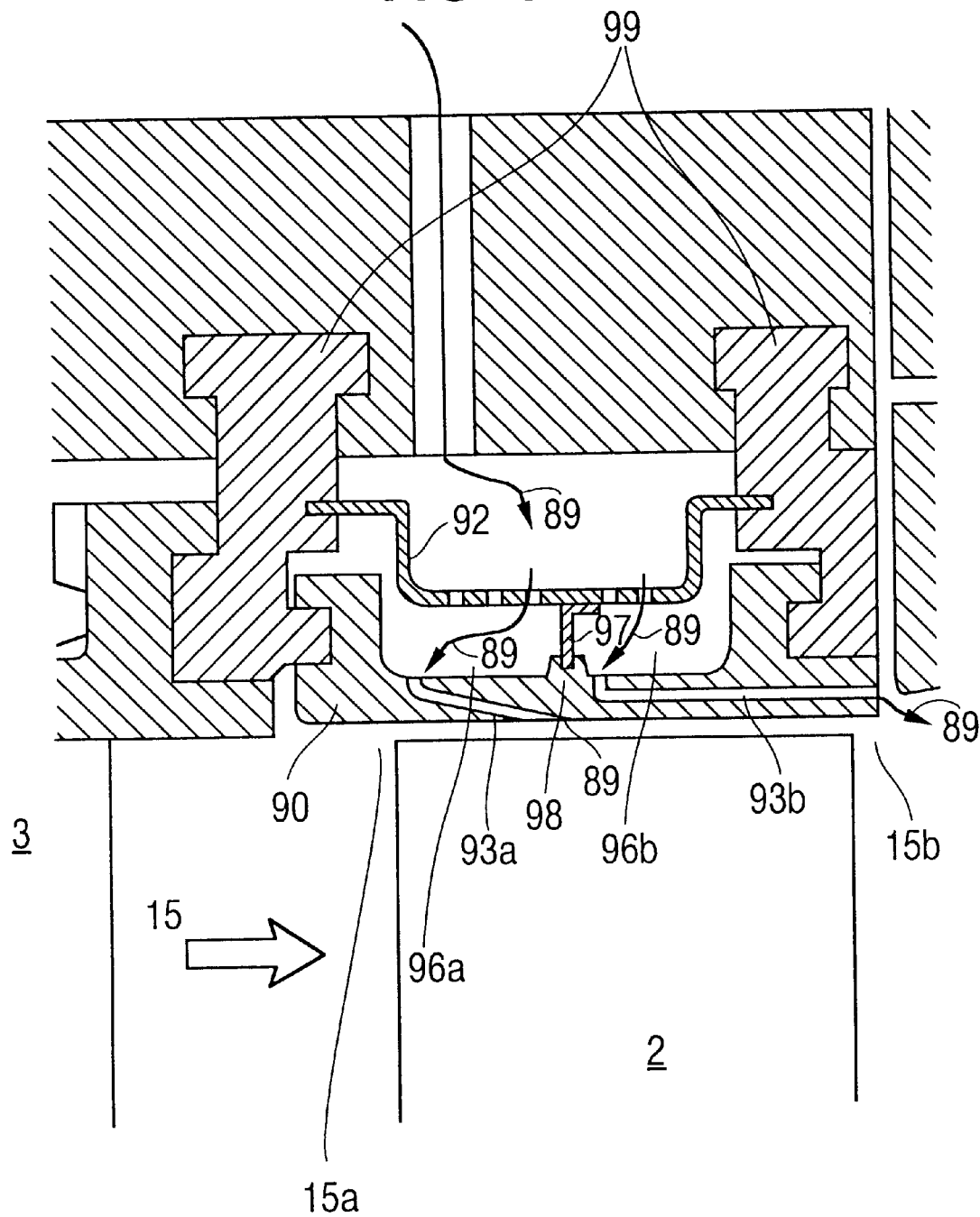
FIG. 3 is a side sectional view of the ring segment cooling structure of FIG. 2.

Reference numeral 90 denotes a ring segment, which is disposed in close proximity to a tip end of a movable vane to seal a gap at the tip end of the movable vane. FIGS. 1–3 show one of the plural ring segments divided along the periphery.

Reference numeral 92 denotes an impingement cooling plate, which is supported by a heat shielding ring 99 so that it is disposed via an appropriate gap relative to the ring segment 90, which is coaxially positioned therewith along the outside periphery of the ring segment 90. The impingement cooling plate 92 forms a cavity for receiving cooling medium between it and the aforementioned ring segment 90, and the cooling medium is supplied through plural impingement cooling holes 91 provided in the plate face.

Reference numeral 98 denotes a groove provided on the surface of the ring segment 90, and the groove extends along the periphery of the ring segment. A pressure partition plate 97, whose top face is in contact with the impingement cooling plate 92, is engaged with the same groove 98 so that the cavity formed between the aforementioned ring segment 90 and the impingement cooling plate 92 is divided into an upstream cavity 96a and a downstream cavity 96b.

The pressure partition plate 97 may be constructed so as to be divided into a plurality of sections located along the circumference of the ring segment 90 and the impingement cooling plate 92. In this case, joint portions 97a thereof in the circumferential direction can be jointed together at end faces with a minute gap and thus a minute amount of leakage is permitted. However, as shown in FIG. 5, by cutting a joint surface in each of the end faces, at the joint portion 97a and joining the cut faces together in the sectional direction, the sealing performance can be improved.

The inside diameter side of the pressure partition plate 97 is engaged with the groove 98 as described above. Although the outside diameter side opposing it has an inverse L-shape, as shown in FIG. 4, the shape of the pressure partition plate 97 is not limited to this shape but it is needless to say that a T-shape or other shape can be selected.

An interior of the upstream cavity 96a is open to a range of the upstream half portion at the tip end of the movable vane 2 through the cooling path 93a, and an interior of the downstream cavity 96b extends substantially in parallel with the axial direction and is open downstream of the movable vane 2 through the cooling path 93b. The respective lengths of the cooling paths 93a, 93b are short enough relative to the lengths in the axial direction of the ring segment 90 and the tip end portion of the movable vane The rear cooling path 93b may be extended substantially parallel to the front cooling path 93a to open toward the downstream side of the tip end portion of the movable vane 2 so as to directly film-cool the tip end face of the movable vane 2 like the front cooling path 93a.

Although each of the impingement cooling plates 92 in the upstream cavity 96a and downstream cavity 96b has a plurality of the impingement cooling holes 91, the impingement cooling holes 91 opening to the upstream cavity 96a and those 91 opening to the downstream cavity 96b are different in the size, shape and quantity of the opening. Also, adjustment of the pressure is achieved such that the upstream cavity 96a maintains a higher pressure than the downstream cavity 96b and, at the same time, the inner pressure of the upstream cavity 96a is higher than the upstream main stream gas 15a and the inner pressure of the downstream cavity 96b is higher than the downstream main stream gas 15b.

Because of such a structure, the cooling medium 89 passes through the impingement cooling holes 91 in the impingement cooling plate 92 and impingement-cools the ring segment 90, which forms the upstream cavity 96a and the downstream cavity 96b. After that, the cooling medium passes through the plural rows of the ring segment cooling paths 93a and 93b extending in the axial direction so as to cool the ring segment 90 again. Finally, the cooling medium 89 is discharged into the main stream gas 15.

By adjusting the pressure of the cooling medium 89 supplied into the upstream cavity 96a and downstream cavity 96b having this ring segment cooling structure, depending on the size, shape, quantity and the like of the impingement cooling holes 91, it is possible to set the pressure of the upstream cavity 96a slightly higher than the pressure of the upstream combustion gas 15a and the pressure of the downstream cavity 96b slightly higher than a pressure of the downstream combustion gas 15b, which has been reduced in comparison to the upstream combustion gas pressure. As a result, there is no fear that in the upstream cavity 96a, relative to the ring segment 90, the main stream combustion gas 15a will flow back and into the downstream cavity 96b, and thus leaking air from each gap portion can be minimized.

By introducing the cooling medium 89 through the cooling paths 93a, 93b, which to pass through the thickness of the ring segment 90, from the upstream cavity 96a and the downstream cavity 96b, respectively, the ring segment 90 is cooled. Further, by blowing this cooling medium 89 against the tip end of the turbine movable vane 2, it can be expected to cool the turbine movable vanes 2.

Although the present invention has been described in connection with the embodiments shown in the Figures, the present invention is not limited to these embodiments but the invention may be modified in various ways within the scope of the present invention.

Although in the structure described above, a single partition wall 97 is disposed between the impingement cooling plate 92 and the ring segment 90 so as to form the upstream cavity 96a and the downstream cavity 96b, a plurality of cavities may be formed by a plurality of partition walls 97.

Next, in the structure shown in FIG. 1, the sealing structure on the inside diameter in the radius direction will be described with reference to FIGS. 1, 6 and 7.

The structure of the sealing portion comprises the box 57, the holding ring 38 and the sealing piece 9. The box 57 is mounted on the inside diameter side of the static vane 3 like the box structure in the conventional airplane gas turbine. The box 57 forms the cavity 53, which is completely sealed except at the hole 54 for supplying the sealing air B, introduced from the outside diameter of the static vane 3, to the upstream cavity 31 on the disc 4.

The sealing piece 9 is mounted on the ring-like holding ring 38 as in the conventional industrial gas turbine. The clearance 6 is formed by the sealing piece 9 and the discs 4, 5. The sealing air B is supplied from the upstream cavity 31 to the downstream cavity 32 through the clearance 6. The air flow governed by only a difference between the thermal elongation of the same holding ring 38 as in the conventional industrial gas turbine and the thermal elongation plus centrifugal elongation of the discs 4 and 5, so that the clearance is easily to be narrowed.

That is, the holding ring 38 is coupled to the box 57 via a fitting portion 19, as shown in FIG. 6. The fitting portion 19 provides a structure for fitting engagement in the diameter direction and blocks any displacement in the axial direction but allows displacement in the radial direction freely. Therefore, no blocking of the thermal elongation in the radial direction occurs so that the thermal deformation of the aforementioned static vane 3 and the like does not affect the holding ring 38.

For the above described structure, the cavity 53 formed by the box 57 has the same structure as the box structure of the conventional airplane gas turbine and forms a completely sealed space except at the hole 34 for supplying the sealing air B to the upstream cavity 31 on the disc 4, and thus generates no air leakage to the other part.

Thus, the flow rate of the sealing air B, which is necessary for maintaining the pressure of the upstream cavity 31 higher than the pressure in the gas passage 7, can be reduced because leaking air is not generated in the cavity 53.

Further, because the sealing piece 9 is mounted on the same ring-like holding ring 38 as in the conventional industrial gas turbine, the clearance 6, for serving as a path for supplying the sealing air B from the upstream cavity 31 to the downstream cavity 32 can be set and, only the difference between the thermal elongation of the holding ring 38 and the thermal elongation plus the centrifugal elongation of the discs 4, 5 may be considered.

Because both of the holding ring 38 and the discs 4, 5 have a small difference in diameter and temperature, the difference of the displacement therebetween is small in the non-steady state. Thus, the clearance 6 on the assembly stage (initial stage) may be set to be small so that the flow rate of the sealing air B supplied from the upstream cavity 31 to the downstream cavity 32 in full operating state can be reduced.

Because the displacement of the clearance 6 is independent of the thermal elongation of the static vane, which is governed by the temperature distribution of the combustion gas having a large deviation, it is not influenced thereby. Therefore, the deviation due to the thermal elongation of the static vane 3 does not have to be considered, and therefore the clearance can be narrowed accordingly, so that the flow rate of the sealing air B from the upstream cavity 31 to the downstream cavity 32 can be reduced.

As described above, according to this embodiment,the structure of the box 57, which eliminates leaking air in the conventional airplane gas turbine, is employed as a sealing structure for preventing invasion of the combustion gas into the discs 4 and 5. And, at the same time, the structure in which the gap 6 in the conventional industrial gas turbine can be narrowed is also employed, thereby obtaining a structure that is effective for reducing the flow rate of the sealing air B.

Although the present invention has been described in connection with the embodiments shown in this specification, the present invention is not limited to these embodiments, but it may be modified in various ways within a scope thereof.

Therefore, on the outside peripheral side, the plural cavities divided by the pressure partition plate into the upstream side and downstream side in the axial direction, in which the pressures thereof are adjusted to different pressures to cope with the main stream gas having a different pressure between the upstream and downstream in the axial direction individually and appropriately. On the upstream side, the backlash of the main stream gas is prevented and on the downstream side, the leakage of the air through a gap is minimized so as to improve the efficiency of the gas turbine. Further, on the inside peripheral side, the cavity inside the static vane is formed by the box for sealing it from the downstream cavity, and thus the sealing air is supplied to the upstream cavity without leakage. As a result, the sealing air is fully supplied to the upstream cavity without leakage and no additional sealing air is needed. Therefore, a drop in the efficiency of the turbine is not induced.

Further, the gas turbine is constructed so as to further comprise a ring-like holding ring supported movably in the radius direction relative to the box which forms the static vane inside diameter side cavity sealingly from the downstream cavity and having a sealing piece on an inside periphery thereof for regulating a clearance communicating from the upstream cavity to the downstream cavity.

Thus, according to the present invention, on the inside diameter side of the gas turbine, because the cavity inside of the static vane is formed by the box sealing it from the downstream cavity, the sealing air is fully supplied to the upstream cavity without leakage. Thereby, no additional sealing air is required and no drop in the efficiency is induced. Further, because the clearance communicating from the upstream cavity to the downstream cavity is regulated by the sealing piece, held by the ring-like holding ring that is movable in the radius direction relative to the box, the same clearance is separated from an influence of the thermal deformation of-the box and static vane. As a result, there is no fear that the seal fin will enlarge the clearance so that a large amount of the sealing air is allowed to flow, thereby leading to a drop of efficiency. Consequently, a stabilized supply of the sealing air, which does not induce a reduction of the efficiency, can be ensured.

What is claimed is:

1. A gas turbine comprising:

a ring segment for forming a casing in which a high temperature combustion main stream gas passes;

an impingement cooling plate, surrounding an outer periphery of said ring segment so as to form a ring segment cavity between said ring segment and said impingement cooling plate;

a box provided on an inside periphery of a static vane to form a static vane inside diameter side cavity, said static vane being disposed between a movable vane and an adjacent movable vane thereof operated by the main stream gas in the casing, wherein sealing air introduced into said static vane inside diameter side cavity is fed to another cavity formed in a gap between the movable vane and the static vane so that a pressure therein is kept higher than a pressure in a gas path; and a pressure partition plate extending in a circumferential direction between said ring segment and said impingement cooling plate, said pressure partition plate dividing said ring segment cavity in the axial direction so as to provide an upstream cavity and a downstream cavity, wherein an internal pressure of said upstream cavity is maintained at a higher internal pressure than an internal pressure of said downstream cavity.

2. The gas turbine as claimed in claim 1, wherein said upstream cavity is open to a tip end of the movable vane through a first ring segment cooling hole, and said downstream cavity is open to the tip of the movable vane through a second ring segment cooling hole, wherein said first and second cooling holes are open to the tip end of the movable vane at different location along an axial direction, and wherein each of said first and second ring segment cooling holes extend through said ring segment from an outer peripheral surface of said ring segment downstream to an inner peripheral surface of said ring segment.

3. A gas turbine comprising:

a ring segment forming a casing in which a high temperature combustion main stream gas passes;

an impingement cooling plate surrounding an outer periphery of said ring segment so as to form a ring segment cavity between the outer periphery of said ring segment and an inner periphery of said impingement cooling plate;

a pressure partition plate extending in the circumferential direction between said ring segment and said impingement plate, said partition plate dividing said ring segment cavity in the axial direction into plural cavities each of which is adjusted to a different pressure thereby forming a cooling structure for said ring segment;

a box provided on an inside periphery of a static vane disposed between a movable vane and an adjacent movable vane, the movable vanes being operated by the main stream gas in the casing, said box forming a static vane inside diameter side cavity, wherein sealing air that is introduced into said static vane inside diameter side cavity is fed to another cavity formed in a gap between the movable vane and the static vane so as to maintain a pressure in the gap at a higher pressure than a pressure in a gas path, wherein said another cavity includes an upstream cavity having a wall face formed by a movable disc disposed in front of the static vane, and a downstream cavity having a wall face formed by another movable disc disposed in back of the static vane where a pressure is lower than in said upstream cavity, and wherein the sealing air is supplied from said static vane inside diameter side cavity to said upstream cavity and said downstream cavity so that the pressures in said upstream cavity and said downstream cavity are raised to a higher level relative to the pressure in the gas path thereby preventing an invasion of the combustion gas into the movable discs.

4. The gas turbine as claimed in claim 3, further comprising:

a holding ring supported on an inner peripheral surface of said box so as to be movable, in a radial direction, relative to said box; and a sealing piece mounted on an inner peripheral surface of said holding ring, wherein said sealing piece regulates a clearance communicating between the upstream cavity and the downstream cavity.

5. A gas turbine comprising:

a ring segment forming a casing through which passes a high temperature combustion main stream gas;

an impingement cooling plate surrounding an outer periphery of said ring segment to form a ring segment cavity between said ring segment and said impingement plate;

a box provided on an inside periphery of a static vane disposed between a movable vane and an adjacent movable vane, wherein said box defines a static vane inside diameter side cavity, and said movable vanes are operated by the main stream gas, wherein sealing air introduced into said static vane inside diameter side cavity is fed to another cavity formed in a gap between the movable vane and the static vane so that a pressure therein is kept at a higher level than a pressure in a gas path, wherein said another cavity includes an upstream cavity having a wall face formed by a movable disc disposed in front of the static vane, and a downstream cavity having a wall face formed by another movable disc disposed in back of the static vane where a pressure is lower than in said upstream cavity, and wherein the sealing air is supplied from said static vane inside diameter side cavity to said upstream cavity and said downstream cavity so that the pressures in said upstream cavity and said downstream cavity are raised to a higher level relative to the pressure in the gas path thereby preventing an invasion of the combustion gas into the movable discs;

a holding ring supported on an inner peripheral surface of said box so as to be movable, in a radial direction, relative to said box; and a sealing piece mounted on an inner peripheral surface of said holding ring, wherein said sealing piece regulates a clearance communicating between the upstream cavity and the downstream cavity.

* * * * *